(12) United States Patent
Nagase

(10) Patent No.: US 7,051,292 B2
(45) Date of Patent: May 23, 2006

(54) INFORMATION INPUT/OUTPUT DEVICE FOR VISUALLY IMPAIRED USERS

(75) Inventor: Mitsuhiro Nagase, Tokyo (JP)

(73) Assignee: Laurel Precision Machines Co., Ltd., Osaka (JP)

( * ) Notice: Subject to any disclaimer, the term of this patent is extended or adjusted under 35 U.S.C. 154(b) by 532 days.

(21) Appl. No.: 09/921,601

(22) Filed: Aug. 6, 2001

(65) Prior Publication Data

US 2002/0021925 A1 Feb. 21, 2002

(30) Foreign Application Priority Data

Aug. 9, 2000 (JP) ............................ P2000-241623

(51) Int. Cl.
*G09G 5/00* (2006.01)
(52) U.S. Cl. .................. 715/865; 434/112; 434/113; 434/114; 434/115; 434/116; 400/109.1
(58) Field of Classification Search ................ 345/173, 345/163, 156, 865, 157; 434/112–117; 341/21, 341/22; 400/109.1; 715/865, 866
See application file for complete search history.

(56) References Cited

U.S. PATENT DOCUMENTS

| | | | | |
|---|---|---|---|---|
| 4,033,053 A | * | 7/1977 | Engler | 434/114 |
| 5,496,174 A | * | 3/1996 | Garner | 434/114 |
| 5,515,305 A | | 5/1996 | Register et al. | 708/145 |
| 6,624,803 B1 | * | 9/2003 | Vanderheiden et al. | 345/156 |
| 6,743,021 B1 | * | 6/2004 | Prince et al. | 434/113 |
| 2002/0045151 A1 | * | 4/2002 | Roberts et al. | 434/113 |

FOREIGN PATENT DOCUMENTS

| | | |
|---|---|---|
| EP | 0 720 130 A | 7/1996 |
| EP | 0 720 130 A1 | 7/1996 |
| JP | 02-134674 | 5/1990 |
| JP | 5-333765 | 12/1993 |
| JP | 07-21444 | 1/1995 |
| JP | 08-220988 | 8/1996 |
| JP | 9-34843 | 2/1997 |
| JP | 9-114365 | 5/1997 |
| JP | 410020769 A * | 1/1998 |
| JP | HEI 10-20769 | 1/1998 |
| JP | 10-255106 | 9/1998 |
| WO | 98-32112 A | 7/1998 |

OTHER PUBLICATIONS

U.S. Appl. No. 60/178,699, filed on Jan. 28, 2000.*

(Continued)

*Primary Examiner*—Tadesse Hailu
(74) *Attorney, Agent, or Firm*—Nixon & Vanderhye, PC

(57) ABSTRACT

The present invention provides an information input/output device for visually impaired users whereby the visually impaired users can easily obtain information for the operation and perform the operation without confusion. This device comprise a braille output unit having a plurality of projectable dotted portions and which enables output of a plurality of braille patterns by controlling the projection of the dotted portions, and a recognition means which recognizes that an operation concerning the braille patterns output by the braille output unit is input when the braille output unit is pushed within a predetermined period of time after the braille patterns are output by the braille output unit. When the user inputs an operation concerning the braille patterns, the user pushes the braille unit in which the braille patterns are output.

15 Claims, 4 Drawing Sheets

OTHER PUBLICATIONS

R. Arrabito and H. Jurgensen, "Computerized Braille typesetting: another view of mark-up standards," Department of Computer science, the University of Western Ontario, Londaon, Ontario, Electronic publishing, vol. 1 (2), 117-131 Sep. 1988.*

IBM Technical Disclosure Bulletin, "Braille Character Electrothermal Display Element," Oct. 1974, US vol. 17, Issue No. 5, p. 1481-1482.*

Office Action in JP 2000-241623 (with partial translation), Apr. 19, 2005.
Office Action in JP 2000-241623, Aug. 4, 2005.
European Search Report for 01-40 2140, dated Nov. 7, 2005.
Office Action in JP 2000-241623, Aug. 4, 2005.
Office Action in JP 2000-241623, Aug. 4, 2005.

* cited by examiner

FIG. 6

| | C1 | C2 | C3 | C4 | C5 | C6 | C7 | C8 | C9 | C10 |
|---|---|---|---|---|---|---|---|---|---|---|
| | あ (A) | か (Ka) | さ (Sa) | た (Ta) | な (Na) | は (Ha) | ま (Ma) | や (Ya) | ら (Ra) | わ (Wa) |
| | い (I) | き (Ki) | し (Si) | ち (Ti) | に (Ni) | ひ (Hi) | み (Mi) | ゆ (Yu) | り (Ri) | を (Wo) |
| | う (U) | く (Ku) | す (Su) | つ (Tu) | ぬ (Nu) | ふ (Hu) | む (Mu) | よ (Yo) | る (Ru) | ん (N) |
| | え (E) | け (Ke) | せ (Se) | て (Te) | ね (Ne) | へ (He) | め (Me) | | れ (Re) | |
| | お (O) | こ (Ko) | そ (So) | と (To) | の (No) | ほ (Ho) | も (Mo) | | ろ (Ro) | |

INFORMATION INPUT/OUTPUT DEVICE FOR VISUALLY IMPAIRED USERS

BACKGROUND OF THE INVENTION

1. Field of the Invention

The present invention relates to an information input/output device for visually impaired users for providing information to visually impaired users in braille, and for receiving instructions concerning the information by the visually impaired users.

2. Description of the Related Art

In vending machines, fare adjustment machines, or cash dispensers located in financial agencies, indications in braille are used for easily providing information to visually impaired users. In these information input/output devices for visually impaired users, push buttons or touch panels with braille indications are provided for receiving instructions concerning the given information from the visually impaired users. This type of information input/output device is disclosed in Japanese Unexamined Patent Application, First Publication, No. Hei 10-255106, for example.

However, in these unmanned automatic machines, at present, in order to perform numerous and complicated operations, the number of buttons for inputting the instructions has increased and the operation of these buttons has become complicated. As a result, with the increase in the number of buttons, it has become difficult to put braille indications on all the buttons, or if the braille indications are put on all the buttons, it is difficult to find the location of the information for the operation or the button for the operation. Therefore, these machines present great difficulties for operation by visually impaired users.

Furthermore, at present, since there is a great variety of automatic machines, the positions of the buttons vary for different machines, and this also causes difficulties in finding buttons for the operation.

The object of the present invention is to provide an information input/output device for visually impaired users with which visually impaired users can easily obtain information and execute operations without confusion.

SUMMARY OF THE INVENTION

In order to achieve the above-described objective, the information input/output device for visually impaired users of the present invention comprises: a braille output unit having a plurality of projectable dotted portions which can output a plurality of braille patterns by controlling the projection of the dotted portions, an input means having a push part which is operated by a pushing operation, and a recognition means which recognizes that an operation concerning the braille patterns output by the braille output unit is input when the push part is pushed within a predetermined period of time after the braille patterns are output by the braille output unit; wherein the push part of the input means comprises the braille output unit.

In this information input/output device for visually impaired users, it is preferable for the braille output unit to be able to output the braille patterns at a plurality of positions along a transverse direction which is perpendicular to the projecting direction of the dotted portions, and for the braille output unit to comprise a control means of the braille patterns which controls the projection of the dotted portions in accordance with the braille patterns to be output, and further controls the projection of the dotted portions so as to move the braille patterns which are output by the dotted portions along the transverse direction while maintaining the arrangement of the braille patterns.

Furthermore, in this information input/output device for visually impaired users as described above, it is preferable to provide a plurality of the input means, with each of them comprising a braille output unit.

BRIEF EXPLANATION OF THE DRAWINGS

FIG. 6 is a table which shows the Japanese syllabary for explaining the input procedure of the embodiment of the information input/output device for visually impaired users of the present invention.

DESCRIPTION OF THE PREFERRED EMBODIMENTS

A preferred embodiment of an information input/output device for visually impaired users of the present invention will be explained in the following with reference to figures.

Figure 1:
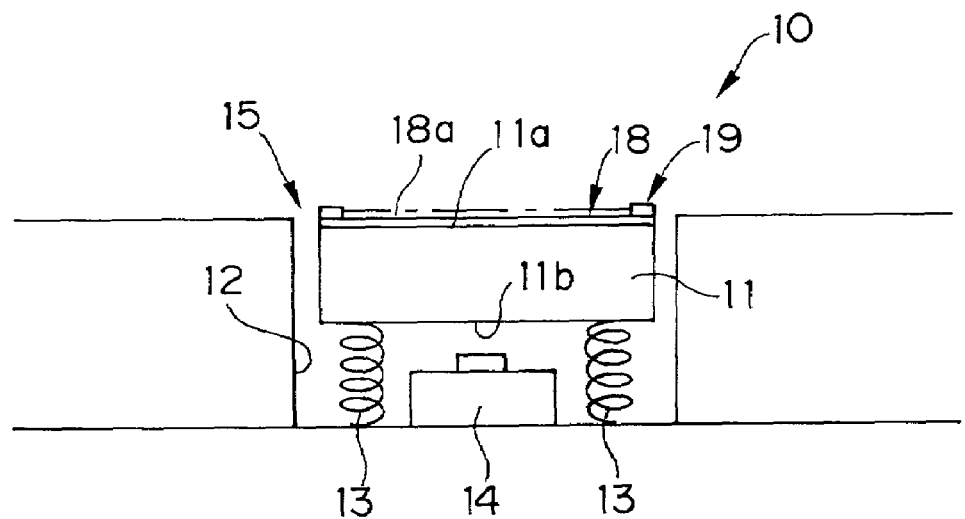
FIG. 1 is a cross sectional side view of an embodiment of the information input/output device for visually impaired users of the present invention.
Figure 3:
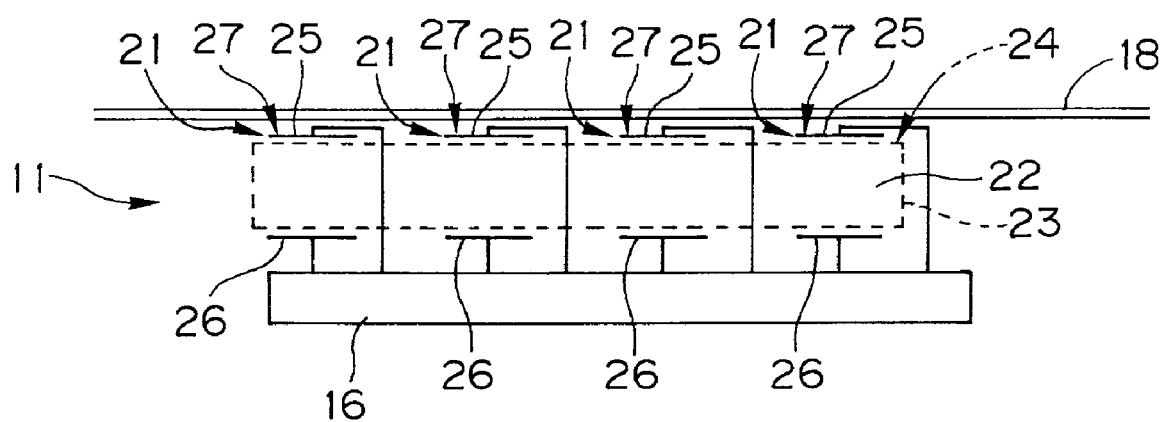
FIG. 3 is a cross sectional side view of a braille output unit of the embodiment of the information input/output device for visually impaired users of the present invention.

This information input/output device for visually impaired users 10 is installed into automatic cash dispensers located in financial agencies, and in FIGS. 1 and 3, the upper part of the figures shows the upper part of the device, and the left and right sides of the figures respectively show the left and right sides of the device.

The information input/output device for visually impaired users 10 has a braille output unit 11 (push part) which has a parallelepiped shape and braille patterns are formed on its front surface 11a, a notch 12 which receives the braille output unit 11 in a manner such that the unit 11 can move up and down, springs 13 which are provided on the rear surface 11b of the braille output unit 11 and urge the braille output unit 11 toward the front surface 11a side, and an information input/output device main body (input means) 15 having a micro-switch (push detection means) 14 which is positioned so as to face the rear surface 11b of the braille output unit 11. The micro-switch 14 is switched ON by the braille output unit 11 when the braille output unit 11 is pushed from the front surface 11a side and moved by a predetermined amount against the force of the springs 13.

Furthermore, the information input/output device for visually impaired users 10 has a controller 16 (corresponding to a control means for the braille patterns, and a recognition means in the claims) which controls the braille patterns output by the braille output unit 11 and receives an output signal from the micro-switch 14. The controller 16 also controls the overall operation of the automatic cash dispenser.

Figure 4:
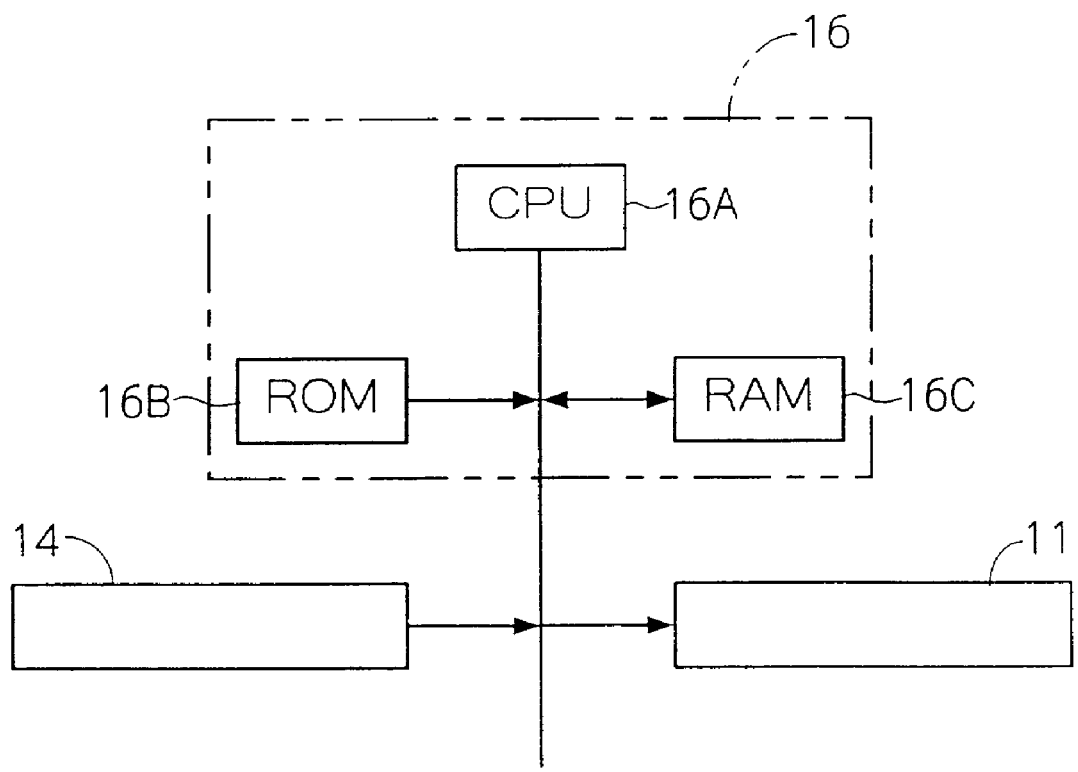
FIG. 4 is a block diagram of a controller of the embodiment of the information input/output device for visually impaired users of the present invention.

As shown in FIG. 4, the controller 16 is composed of a CPU 16A, a ROM 16B which stores control programs, and a RAM 16C which stores input information or the like.

Moreover, as shown in FIG. 1, a protective membrane 18 is adhered to the whole front surface 11a of the braille output unit 11, and a finger detector 19 is provided over the surface 18a of the protective membrane 18 for detecting the touch of a finger on the surface 18a.

The protective membrane 18 is composed of a substance or substances having high flexibility, and permits accurate reading of the braille patterns output by the braille output unit 11 by the user's finger when the finger touches the braille patterns through the protective membrane 18.

The finger detector 19 is composed of a luminous element and a light receiving element which are provided at the respective ends of the surface 18a of the protective membrane 18 so as to face each other. When the user's finger is not present between these elements, the light emitted by the luminous element enters the light receiving element. Otherwise, when the finger touches protective membrane 18, the light is interrupted by the finger since the finger is located between these elements, and the touch of the finger on the protective membrane 18 is detected.

The braille output unit 11 provides a plurality of dotted portions 21 which can project and retract in the up and down directions as described later, and changes the arrangement of the projecting dotted portions 21 at regular intervals of time in order to move a series of braille patterns output by the dotted portions 21 at intervals of the width of each pattern in the transverse direction (left and right directions) with maintaining their order. The dotted portions 21 are arranged so as to output the braille patterns at a plurality of positions along the transverse direction. In practice, in this braille output unit 11, since each braille pattern is outputed by six points, it is necessary to provide three dotted portions 21 along the longitudinal direction and two dotted portions 21 along the transverse direcion in order to output each braille pattern. However, in the dotted portions 21, four dotted portions 21 are provided along the transverse direction by adding 1 column of dotted portions 21 to each side along the transverse direction while the three dotted portions 21 along the longitudinal direction are provided.

Figure 2:
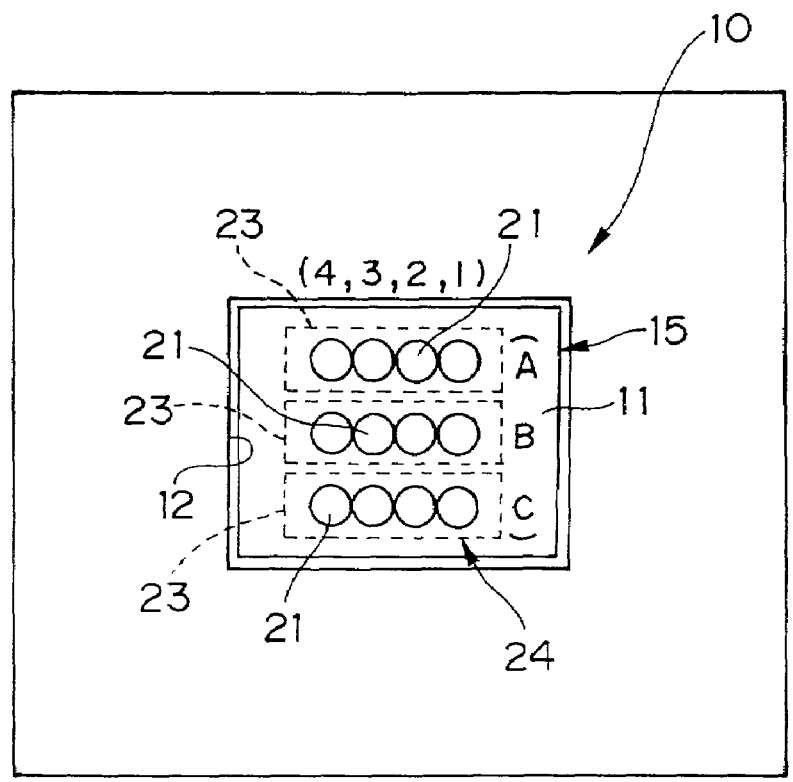
FIG. 2 is a plan view of the embodiment of the information input/output device for visually impaired users of the present invention.

Furthermore, as shown in FIGS. 2 and 3, the braille output unit 11 has an electrical viscous fluid portion 24 which is equipped with a plurality of bags 23 in which an electrical viscous fluid 22 is enclosed. These bags 23 are laid along the transverse direction so as to provide three lines along the longitudinal direction in FIG. 2 in conformity with the positions of the dotted portions 21, and a plurality of driving portions 27 are provided along the direction in which the bags 23 are lain. Each driving portion 27 has a pair of thin discoid shaped electrodes 25, 26 which are provided on the outer side of each bag 23 so as to sandwich the bag 23 from the protective membrane 18 side and the opposite side. Here, the electrical viscous fluid 22 contains particles which freely flow when no electric field is present and which connect to each other like chains by induced polarization when an electric field is present, and therefore, the viscosity of the electrical viscous fluid 22 increases depending on the application of the electric field. In this case, a single bag which is not divided can be used in place of the bags 23.

The electric field of the electrical viscous fluid 22 can be partially changed by applying a voltage by means of each driving portion 27. As a result, each driving portion 27 partially increases the viscosity of the electrical viscous fluid 22 between the electrodes 25, 26 and forms a rigid portion which cannot be easily moved back by the pushing force of a finger. This rigid portion of the electrical viscous fluid 22 between the electrodes 25, 26 is raised relative to the rest of the electrical viscous fluid 22 which surrounds the rigid portion and has relatively low viscosity, and consequently, the dotted portion 21 corresponding to the rigid portion is projected. A plurality of dotted portions 21 as described above have the above-mentioned structures so as to output the braille patterns at a plurality of positions along the transverse direction.

The controller 16 is connected with each driving potion 27 and respectively controls the projection of each dotted portion 21 in accordance with the braille patterns to be output in order to output a plurality of braille patterns, by controlling the voltage applied between the electrodes 25, 26 of each driving portion 27. The controller 16 further controls the projection of each dotted portion 21 so as to move the braille patterns which are output by the dotted portions 21 along the transverse direction while maintaining the arrangement of these braille patterns.

Furthermore, the controller 16 recognizes that an operation concerning the braille patterns is input only when the braille output unit 11 is pushed and the micro-switch 14 switches ON within a predetermined period of time after the braille patterns are output by the braille output unit 11 (Specifically, within a predetermined period of time after an arbitrarily selected from the start of the projection of the dotted portions 21 to the conclusion of the return of the projected dotted portions 21). For example, if braille patterns which request a YES/NO input operation are output by the braille output unit 11, the controller 16 recognizes that YES is input when the micro-switch 14 switches ON within the predetermined period of time so that the signal from the micro-switch 14 is considered as an answer to the braille patterns, based on the output time of the braille patterns. Otherwise, the controller 16 recognizes that NO is selected when the micro-switch 14 is not switched ON within the predetermined period of time as described above.

Next, the operation of the above-mentioned information input/output device 10 will be explained. When the finger of the user touches the surface 18a of the protective membrane 18, the finger sensor 19 detects it and the controller 16 recognizes that a visually impaired user will use the device.

After the above recognition, the controller 16 outputs the first braille pattern on one side in the right-and-left direction (on the right side from the viewpoint of the visually impaired user for example) of the braille output unit 11 and moves the braille pattern to the other side (to the left side from the viewpoint of the visually impaired user for example) while maintaining the pattern.

Figure 5:
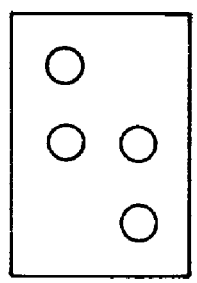
FIG. 5 is a plan view of a braille output by the embodiment of the information input/output device for visually impaired users of the present invention.

Here, the specific procedure for moving the braille pattern as shown in FIG. 5 will be explained below. In this explanation, the position of each dotted portion 21 is denoted by the combination of rows A, B, and C from above and columns 1, 2, 3, and 4 from the right as shown in FIG. 2. Namely, the position of each dotted portion is denoted by (row, column).

For moving the braille pattern, first, the viscosity of the dotted portions 21 at positions (A, 1) and (B, 1) is increased by applying a voltage between the electrodes 25, 26 corresponding to these positions.

Next, the viscosity of the dotted portions 21 at positions (A, 1) and (B, 1) is decreased by reducing the voltage applied between the electrodes 25, 26 corresponding to these positions, while the viscosity of the dotted portions 21 at positions (A, 2) and (B, 2) is increased by applying a voltage between the electrodes 25, 26 corresponding to these positions.

Next, the viscosity of the dotted portions 21 at positions (A, 2) and (B, 2) is decreased by reducing the voltage applied between the electrodes 25, 26 corresponding to these positions, while the viscosity of the dotted portions 21 at positions (A, 3) and (B, 3) is increased by applying a voltage between the electrodes 25, 26 corresponding to these positions, and simultaneously, the viscosity of the dotted portions 21 at positions (B, 1) and (C, 1) is increased by applying a voltage between the electrodes 25, 26 corresponding to these positions. As a result, the braille pattern as shown in FIG. 5 which is output by four dotted points 21 at (A, 3), (B, 3), (B, 1) and (C, 1) is output on one side of braille output unit 11.

Next, the viscosity of the dotted portions 21 at positions (A, 3) and (B, 3) is decreased by reducing the voltage applied between the electrodes 25, 26 corresponding to these positions, while the viscosity of the dotted portions 21 at positions (A, 4) and (B, 4) is increased by applying a voltage between the electrodes 25, 26 corresponding to these positions, and simultaneously, the viscosity of the dotted portions 21 at positions (B, 1) and (C, 1) is decreased by reducing the voltage applied between the electrodes 25, 26 corresponding to these positions, while the viscosity of the dotted portions 21 at positions (B, 2) and (C, 2) is increased by applying a voltage between the electrodes 25, 26 corresponding to these positions. As a result, the braille pattern output by dotted points 21 at (A, 3), (B, 3), (B, 1) and (C, 1) is transversely moved to four adjacent dotted points 21 at (A, 4), (B, 4), (B, 2) and (C, 2) while maintaining its pattern.

Next, the viscosity of the dotted portions 21 at positions (A, 4) and (B, 4) is decreased by reducing the voltage applied between the electrodes 25, 26 corresponding to these positions, while the viscosity of the dotted portions 21 at positions (B, 2) and (C, 2) is decreased by reducing the voltage applied between the electrodes 25, 26 corresponding to these positions, and simultaneously, the viscosity of the dotted portions 21 at positions (B, 3) and (C, 3) is increased by applying a voltage between the electrodes 25, 26 corresponding to these positions.

Furthermore, the viscosity of the dotted portions 21 at positions (B, 3) and (C, 3) is decreased by reducing the voltage applied between the electrodes 25, 26 corresponding to these positions, while the viscosity of the dotted portions 21 at positions (B, 4) and (C, 4) is increased by applying a voltage between the electrodes 25, 26 corresponding to these positions.

Finally, the viscosity of the dotted portions 21 at positions (B, 4) and (C, 4) is decreased by reducing the voltage applied between the electrodes 25, 26 corresponding to these positions.

By controlling the projections of the dotted portions 21 in accordance with the procedure described above, the braille pattern output on one side of braille output unit 11 is transversely moved to the other side of the braille output unit 11, and disappears from the other side of the braille output unit 11. Therefore, a visually impaired user can read the braille pattern as it moves in the transverse direction through the protective membrane 18 without moving his finger. That is, it is unnecessary for the user to move his finger to read the braille pattern.

Here, the controller 16 also controls the speed of the increase or reduction in voltage in order to continuously move the dotted portions 21.

When the output of the braille pattern corresponding to the first letter is completed, the controller 16 outputs the braille pattern corresponding to the second letter and moves it from one side to the other side of the braille output unit 11 by the same procedure, at a predetermined interval of time.

As described above, the information input/output device can provide the required information to a visually impaired user by repeating the procedure which outputs the braille pattern and moves it from one side to the other side and outputs the next braille pattern at a predetermined interval of time, and allowing a visually impaired user to read all the braille patterns.

If braille patterns which request a YES/NO input operation are output by the braille output unit 11, the controller 16 recognizes that a command for the next operation concerning the output braille patterns has been input when the braille output unit 11 is pushed and the micro-switch 14 switches ON within a predetermined period of time from the output time of braille patterns.

For example, the controller 16 controls braille output unit 11 so as to output braille patterns stating "Please push this unit when your desired operation is output" and then outputs braille patterns stating "deposit of money" and "withdrawal of money" and the like at predetermined intervals of time. When the user wishes to deposit money, the user pushes the braille output unit 11 and switches the micro-switch 14 ON within the predetermined period of time from the output time of the braille patterns which states "deposit of money", and as a result of the micro-switch 14 being ON at this time, the controller 16 considers that the user has selected the command for deposit of money and begins the concrete operation for the deposit of money. Otherwise, when the user wishes to withdraw money, the user pushes the braille output unit 11 and switches the micro-switch 14 ON within the predetermined period of time from the output time of the braille patterns which states "withdrawal of money", and as a result of the micro-switch 14 being ON at this time, the controller 16 considers that the user has selected the command for the withdrawal of money and begins the concrete operation for the withdrawal of money.

Furthermore, in the case of inputting letters such as the user's name, the controller 16 controls the braille output unit 11 so as to output braille patterns stating "Please push this unit when the desired letter is output" and to output braille patterns corresponding to the letters of the alphabet in alphabetical order at predetermined intervals of time. When the braille pattern corresponding to the desired letter is output, the user pushes the braille output unit 11 and switches the micro-switch 14 ON within the predetermined period of time from the output time of the braille pattern corresponding to the desired letter. As a result of switching the micro-switch 14 ON at this time, the controller 16 considers that the user has selected this letter and stores the information of the selected letter in the RAM 16C, and the desired letters are input by repeating the above-described operation.

Here, in order to assist the following explanation, the Japanese "hiragana" syllabary comprising 46 characters is shown in FIG. 6. In FIG. 6, these characters are divided into ten groups as shown in columns C1 to C10 in accordance with their readings. Each column has five or three characters the characters denoted in the left part of each column show the original Japanese characters, and the English letter(s) given in parenthesis to the right side of each Japanese character shows the English readings of the Japanese character. In the following explanation, the English letter(s) given in parenthesis will be used instead of the corresponding Japanese character shown in FIG. 6.

The output of the syllabary using the braille patterns on the braille output unit 11 can be performed by outputting the characters in order such as "(A), (I), (U), (E), (O), (Ka), (Ki), (Ku), . . . " in accordance with their readings, or by dividing the syllabary into ten groups corresponding to the columns C1 to C10 shown in FIG. 6 and outputting first characters (A), (Ka), (Sa), (Ta), (Na), . . . of these groups in order as shown in the top line of FIG. 6, with the braille patterns at predetermined intervals of time. In the latter case, the user pushes the braille output unit 11 and switches the micro-switch 14 ON when the braille pattern corresponding to the first character of the group including the desired character is output. Then, the braille patterns corresponding to the characters included in the group are output in order, and the user selects the desired character from the group by pushing the braille output unit 11. For example, when the braille output unit 11 outputs the first characters (A), (Ka), (Sa), (Ta), (Na), . . . of each group with the braille patterns and the user selects the character (Na), the braille output unit 11 further outputs five characters (Na), (Ni), (Nu), (Ne), (No) included in the selected group corresponding to the column C5 in this order with the braille patterns, and the user selects the desired one of the five characters by pushing the braille output unit 11.

According to the information input/output device for visually impaired users 10, since the braille pattern output unit 11 outputs the braille patterns in order by controlling the projection of the dotted portions 21, the user can understand the meaning of a plurality of braille patterns as long as he touches the braille pattern output unit 11 without moving his finger. Furthermore, when the user performs further operations concerning the output braille patterns, the user pushes the braille output unit 11 and switches the micro-switch 14 ON within the predetermined period of time. Then, since the controller 16 recognizes that an operation for the output braille patterns is input only when the braille output unit 11 is pushed and the micro-switch 14 switches ON within the predetermined period of time after the braille patterns are output, as described above, if the braille output unit 11 is pushed and the micro-switch 14 switches ON within the predetermined period of time, the controller 16 recognizes that a further operation is input concerning the braille patterns, or if the micro-switch 14 is not ON within the predetermined period of time, the controller 16 recognizes that no further operation is input concerning the braille patterns. Consequently, the user can perform a further operation concerning the output braille patterns only by pushing the braille output unit 11 without searching for other push buttons or the like.

Therefore, a visually impaired user can easily obtain information for the operation of the device and can easily operate the device without confusion.

Furthermore, the controller 16 controls the projection of each dotted portion 21 in accordance with the braille patterns to be output in order to output a plurality of the braille patterns, and further controls the projection of each dotted portion 21 so as to move the braille pattern which is output by the dotted portions 21 along the transverse direction while maintaining the arrangement of the braille pattern. Therefore, since the braille patterns move transversely by changing the projection of the dotted portions 21, it is unnecessary for the user to move his finger to read the output braille patterns.

Consequently, a visually impaired user can read a plurality of braille patterns without moving his fingers and can obtain the information for the operation of the device more easily.

Furthermore, the controller 16 regulates the voltage which is applied to the driving portion 27 of the braille output unit 11 and the changing of the electric field of the electrical viscous fluid 22 of the electrical viscous fluid portion 24 of the braille output unit 11 so as to control the projection of the dotted portions 21 which are composed of the electrical viscous fluid 22. That is, the projection of the dotted portions 21 is controlled by the change in viscosity of the electrical viscous fluid 22 due to the change in the electric field, and therefore, the speed of projection of the dotted portions 21 and the retraction of the projected dotted portions 21 can be precisely controlled by regulating the voltage. Consequently, the projection of the dotted portions 21 and the retraction of the projected dotted portions 21 for moving the braille pattern can be smoothly performed.

In addition, a mechanism having a dot forming member, a micro-solenoid, and a spring can be used as the mechanism for projecting and retracting each dotted portion 21. In this mechanism, when the micro-solenoid is OFF, the dotted portion 21 is projected by means of the projection of the dot forming member with the pressing force of the spring, and, the projected dotted portion 21 is retracted by means of the retraction of the projected dot forming member against the pressing force of the spring by switching the micro-solenoid ON.

In addition, a mechanism having a dot forming member which is composed of a cylindrical shaped elastic rubber member and electrical viscous fluid filled therein, and a spiral micro-solenoid for changing the magnetic flux of the electrical viscous fluid in the elastic rubber member. can be used as the mechanism for projecting and retracting each dotted portion 21. In this mechanism, when a voltage is applied to the spiral micro-solenoid, the dotted portion 21 is projected by means of the projection of the dot forming member as a result of the movement of the electrical viscous fluid and the elastic rubber member in the upper direction, and when the application of the voltage to the micro-solenoid is stopped, the projected dotted portion 21 is retracted by means of the retraction of the projected dot forming member by the weight thereof.

In this embodiment, a plurality of input/output device main bodies 15, each comprising the above-described braille output unit 11, can be provided.

In this case, the user can respectively touch different braille output units 11 of the input/output device main bodies 15 with several fingers, and therefore, a large amount of information can be input and output in a short time, and the time for the input and output operations can be shortened.

For example, when inputting Japanese characters, ten input/output device main bodies 15 can be provided, and each of the user's fingers, can touch the respective braille output units 11 of these ten input/output device main bodies 15. Each braille output unit 11 outputs the braille pattern corresponding to the first character (A), (Ka), (Sa), (Ta), (Na), . . . of each group corresponding to the columns C1 to C10 shown in FIG. 6 in order from the left side, so as to put the little finger of the left hand on the braille output unit 11 which outputs (A), and to put the ring finger of the left hand on the braille output unit 11 which outputs (Ka), and so on. When the user pushes the braille output unit 11 which outputs the group containing the desired character, the pushed braille output unit 11 outputs braille patterns corresponding to the characters included in the group in order, and the user selects the desired character by pushing the braille output unit 11.

For example, when inputting the Japanese characters corresponding to (To), (U), (Ka), (I), the user pushes the braille output unit 11 which is located under the index finger of the left hand and outputs the braille pattern corresponding to the first character (Ta) of the group corresponding to the column C4, in order to output the braille patterns corresponding to the five characters (Ta), (Ti), (Tu), (Te), (To) of the selected group in this order, and when the braille pattern corresponding to the fifth character (To) is output, the user pushes the braille output unit 11. As a result, the controller 16 stores the character (To) into the RAM 16C. Next, the user pushes the braille output unit 11 which is located under the little finger of the left hand and outputs the braille pattern corresponding to the first character (A) of the group corresponding to the column C1, in order to output the braille patterns corresponding to the five characters (A), (I), (U), (E), (O) of the selected group in this order, and when the braille pattern corresponding to the third character (U) is output, the user pushes the braille output unit 11 so as to store the character (U) into the RAM 16C. Next, the user pushes the braille output unit 11 which is located under the ring finger of the left hand and outputs the braille pattern corresponding to the first character (Ka) of the group corresponding to the column C2, in order to the output braille patterns corresponding to the five characters (Ka), (Ki), (Ku), (Ke), (Ko) of the selected group, and when the braille pattern corresponding to the first character (Ka) is output, the user pushes the braille output unit 11 so as to store the character (Ka) into the RAM 16C. Further, the user pushes the braille output unit 11 which is located under the little finger of the left hand and outputs the braille pattern corresponding to the first character (A) of the group corresponding to the column C1, in order to output the braille patterns corresponding to the five characters (A), (I), (U), (E), (O) of the selected group in this order, and when the braille pattern corresponding to the second character (I) is output, the user pushes the braille output unit 11 so as to store the character (I) into the RAM 16C. And then, the input operation for the Japanese characters corresponding to (To), (U), (Ka), (I) is completed by performing a separate ending operation. In this case, it is desirable for the input/output device main body 15 for giving information such as "deposit of money" and "withdrawal of money" to the user be provided separately from the input/output device main body (or bodies) 15 for inputting the characters.

What is claimed is:

1. An information input/output device for visually impaired users, comprising:
    a braille output unit including a plurality of projectable dotted portions and enabling output of a plurality of braille patterns by controlling projection of the dotted portions;
    an input device including a push part which is operated by a pushing operation; and
    a recognition section for recognizing whether or not there is input for an operation toward character information indicated by braille patterns which are output by the braille output unit; input or not;
    wherein the braille output unit also functions as the push part of the input device, and
    the recognition section recognizes that the operation toward the character information is input when the push part is pushed within a specified period of time after the character information is indicated by the braille patterns, and also recognizes that an operation toward the character information is not input when the push part is not pushed within the specified period of time after the character information is indicated by the braille patterns.

2. An information input/output device according to claim 1, wherein the braille output unit enables output of braille patterns at a plurality of positions along a transverse direction which is perpendicular to a direction of projection of the dotted portions, and the braille output unit comprises a braille pattern control section which controls the projection of the dotted portions in accordance with the output braille pattern, and further controls the projection of the dotted portions so as to move a braille pattern output by the dotted portions along the transverse direction while maintaining an arrangement of the braille pattern.

3. An information input/output device according to claim 1, further comprising a plurality of said input means, each comprising a respective braille output unit.

4. An information input/output device according to claim 1, wherein a plurality of bags in which an electrical viscous fluid is enclosed are positioned in conformity with the positions of the dotted portions, and the projection of the dotted portions are controlled by changing viscosity of the electrical viscous fluid in each of the bags.

5. An information input/output device according to claim 1, embodied as a part of a vending machine.

6. An information input/output device according to claim 1, embodied as a part of a fare adjustment machine.

7. An information input/output device according to claim 1, embodied as a part of a cash dispenser.

8. An information input/output device according to claim 1, wherein the recognition section recognizes that a YES/NO input operation toward the character information is YES when the push part is pushed within the specified period of time after the character information is indicated by the braille patterns, and also recognizes that the YES/NO input operation toward the character information is NO when the push part is not pushed within the specified period of time after the character information is indicated by the braille patterns.

9. An information input/output device for visually impaired users, comprising:
    a user-actuatable push part comprising a braille output surface for outputting braille characters, the braille output surface comprising openings through which selectively actuated pins extend to form the braille characters;
    a processing system for controlling the outputting of the braille characters on the braille output surface and processing user response to the outputting of the braille characters, the processing system recognizing that a response to the braille characters output by the braille output surface is input when the push part is actuated by a pushing operation within a specified period of time after the braille characters are output by the braille output surface and the processing system recognizing that no response to the braille characters output by the braille output surface is input when the push part is not actuated by a pushing operation within the specified period of time after the braille characters are output by the braille output surface.

10. An information input/output device according to claim 9,
    wherein the braille output surface provides braille characters at a plurality of positions along a transverse direction which is perpendicular to a direction of projection of the pins, and
    the processing system further controls the projections of the pins so as to move the braille characters along the transverse direction.

11. An information input/output device according to claim 10, further comprising:
    at least one additional user-actuatable push part, each additional push part comprising its own braille output surface.

12. An information input/output device according to claim 9, further comprising:
   at least one additional user-actuatable push part, each additional push part comprising its own braille output surface.

13. An information input/output device according to claim 9, embodied as part of a vending machine.

14. An information input/output device according to claim 9, embodied as part of a fare adjustment machine.

15. An information input/output device according to claim 9, embodied as part of a cash dispenser.

* * * * *